United States Patent [19]

Huskins

[11] B 3,914,140

[45] Oct. 21, 1975

[54] PROPELLANT WITH MIXED CARBOXYL POLYBUTADIENE AND CARBORANYL METHACRYLATE-BUTADIENE-ACRYLIC ACID TERPOLYMER AS BINDER

[75] Inventor: Chester W. Huskins, Huntsville, Ala.

[73] Assignee: The United States of America as represented by the Secretary of the Army, Washington, D.C.

[22] Filed: Mar. 30, 1970

[21] Appl. No.: 24,017

[44] Published under the Trial Voluntary Protest Program on January 28, 1975 as document no. B 24,017.

[52] U.S. Cl. .............................. 149/19.2; 149/19.9

[51] Int. Cl.² .............................. C06D 5/06

[58] Field of Search .............. 260/80.7, 80.71, 80.8, 260/80.81; 149/19, 76, 22, 44

[56] References Cited

UNITED STATES PATENTS

| | | | |
|---|---|---|---|
| 3,183,216 | 5/1965 | Cohen et al. | 260/83.5 |
| 3,255,059 | 6/1966 | Hamermesh et al. | 149/19 |
| 3,301,836 | 1/1967 | Green et al. | 260/86.1 |
| 3,476,622 | 11/1969 | Harada et al. | 149/19 |
| 3,499,926 | 3/1970 | Alexander et al. | 149/22 X |
| 3,535,174 | 10/1970 | Bornstein | 149/19 |

*Primary Examiner*—Benjamin R. Padgett
*Assistant Examiner*—E. A. Miller
*Attorney, Agent, or Firm*—Nathan Edelberg; Robert P. Gibson; Jack W. Voigt

[57] ABSTRACT

Propellant compositions utilizing a terpolymer constituted of carboranyl methacrylate, butadiene, and acrylic acid are disclosed as having a wide range of burning rates. The propellants are comprised of a binder selected from the terpolymer, the terpolymer in combination with carboxy-terminated polybutadiene, and the terpolymer in combination with polybutadiene-acrylic acid copolymer. The propellants contain the additional ingredients consisting of ammonium perchlorate oxidizer, aluminum powder fuel, lecithin, and curatives selected from diaziridines, triaziridines, diepoxides, triepoxides, and combinations of the same.

7 Claims, No Drawings

PROPELLANT WITH MIXED CARBOXYL POLYBUTADIENE AND CARBORANYL METHACRYLATE-BUTADIENE-ACRYLIC ACID TERPOLYMER AS BINDER

BACKGROUND OF THE INVENTION

Burning rates of solid propellants have been increased by introduction of additives. More recently carborane derivatives have been used as additives for the purpose of burning rate control. The additives, usually in the form of liquids, exhibit the inherent disadvantages characteristic of liquid additives such as loss by evaporation, and/or migration; such losses are detrimental to the finished propellant since the propellant would not, as a result of the described losses, be able to burn evenly to produce reliability needed for present day missiles and weaponry.

Polybutadienes, having carboxyl functionality or hydroxyl functionality, have been used as the binder constituent of solid propellants. The functional groups provide cross-linking sites which are connected during the curing or reaction phase while in the presence of the appropriate curing agent. Diisocyanates are well known curing agents for hydroxyl functionality binder constituents. Diaziridines, triaziridines, diepoxides, and triepoxides, and combinations of the same, are well known for use in curing binder constituents having carboxyl functionality.

A desirable combination would be a propellant composition which is comprised of polymeric materials which function as the binder and burning rate catalyst.

An object of this invention is to provide propellant formulations which employ a terpolymer (e.g., a polymer containing three monomeric units) for use as the binder and burning rate controller.

A further object is to provide solid propellant compositions which have a wide range of burning rates which rates are proportional to the corboranyl methacrylate contained in the compositions.

SUMMARY OF THE INVENTION

A terpolymer of butadiene, carboranyl methacrylate, and acrylic acid is prepared in an aqueous mixture by an emulsion polymerization process employing a quaternary ammonium chloride compound such as benzylcetyldimethylammonium chloride as the emulsifier, azo-bis-isobutyronitrile as the free radical type initiator, and dodecylmercaptan as the chain terminating agent. The stable terpolymer may be varied in carboranyl methacrylate content from about 15 to about 75 percent by weight of the terpolymer, in butadiene content from about 10 to about 80 percent by weight of the terpolymer, and in acrylic acid content from about 2 to about 20 percent by weight of the terpolymer.

The emulsion polymerization process employs a concentration of ingredients, based on a percent of the total weights of the three monomers specified generally as follows: the chain terminating agent up to about 10 percent of the monomer weights, the emulsifier up to about 6 percent of the monomer weights, and the initiator up to about 2 percent of the monomer weights. For lower molecular weight terpolymer, a higher percent chain terminating agent is used and likewise, when a higher molecular weight is desired, a lower percent of chain terminating agent is used. The aqueous solution ratio to reactants is from about 1 to 1 to about 2 to 1. A water solution yields a good emulsion wherein the polymerization takes place. The temperature range of the polymerization mixture may vary according to the particular systems used; however, a temperature in the range of about 50°C allows the polymerization to proceed smoothly and at a suitable rate for an average batch process.

The terpolymer as described above, is used with ammonium perchlorate oxidizer, powdered aluminum fuel, optional curatives and additives to yield propellant compositions having burning rates over the range from about 0.4 inches/second to about 3.5 inches/second. The propellant of this invention contains from about 15 to about 30 percent terpolymer by weight of the propellant, aluminum powder fuel from about 10 to about 20 percent by weight of the propellant composition, ammonium perchlorate oxidizer from about 50 to about 70 percent by weight of the propellant composition and optional additives for processing and curing the propellant (such as lecithin in an amount from about 0.2 to about 0.5 percent by weight, and special curatives up to about a total of 2 percent by weight of the other propellant ingredients). Optionally, the binder-terpolymer can be used with carboxy-terminated polybutadiene to adjust the burning rate of the propellant as desired.

DESCRIPTION OF THE PREFERRED EMBODIMENTS

The ingredients listed below are combined in a polymerization container equipped with agitation means, and temperature controlling and measuring means.

| Ingredients | Weight |
|---|---|
| Butadiene | 26.0 grams |
| Carboranylmethacrylate (CMA) | 6.0 grams |
| Dodecylmercaptan | 4.0 grams |
| Azo-bis-isobutyronitrile | 0.6 grams |
| Benzylcetyldimethylammonium Chloride | 2.0 grams |
| Acrylic Acid | 5.0 grams |
| Water | 60 ml. |

The polymerization mixture of the above ingredients is placed in a water bath at 50°C. A shaking action or agitation action provides an emulsion wherein the polymerization is allowed to take place. Although the polymerization is essentially completed in a few hours, the polymerization mixture is separated after about 16 hours. Separation of the polymer is accomplished by pouring the polymerization mixture into a beaker, acidifying with hydrochloric acid, and then adding sufficient tetrahydrofuran (THF) to separate the polymer from the mixture. The polymer which is contained in the (THF) layer is separated by means of a separatory funnel. After drying the polymer, a yield (approaching 100% yield) was calculated on the basis of the weight of the ingredients used and the weight of the polymer recovered. The polymeric material was characterized by gel permeation chromatography and infrared measurements. The results show the presence of a terpolymer containing the monomers, carboranyl methacrylate, butadiene, and acrylic acid.

Samples of propellant using varying amounts of the terpolymer equivalent were prepared for burning rate comparisons. All propellants (including a standard propellant which contained a carboxy terminated polybutadiene binder) contained a blend of particle sized ammonium perchlorate (AP) containing substantially 36 percent by weight of 6 micron sized, 27 percent by weight of 17 micron sized, and 37 percent by weight of 200 micron sized. The type ammonium perchlorate selected is easily blended, and it provides a uniform burning rate and range of burning rates for testing. Table I sets forth propellant compositions A, B, and C containing the equivalent terpolymer (as binder) with 25 percent CMA, 50 percent CMA, and 75 percent CMA, respectively, along with blended AP, aluminum powder and lecithin. Composition D is the standard which contained carboxy-terminated polybutadiene binder (0% CMA).

TABLE I

| Composition | Ingredients | Percent by Weight |
|---|---|---|
| A | Terpolymer (25% CMA) | 19.7 |
| | AP | 64.0 |
| | Aluminum powder fuel | 16.0 |
| | Lecithin | 0.3 |
| | | 100.0 |
| B | Terpolymer (50% CMA) | 19.7 |
| | AP | 64.0 |
| | Aluminum powder fuel | 16.0 |
| | Lecithin | 0.3 |
| | | 100.0 |
| C | Terpolymer (75% CMA) | 19.7 |
| | AP | 64.0 |
| | Aluminum powder fuel | 16.0 |
| | Lecithin | 0.3 |
| | | 100.0 |
| D (standard) | Carboxy-terminated polybutadiene | 19.7 |
| | AP | 64.0 |
| | Aluminum powder fuel | 16.0 |
| | Lecithin | 0.3 |
| | | 100.0 |

Compositions A, B, C, and D were packed into straws and burned. Burning rates at 1,000 psia ranged from 0.25 in./sec/ for a standard propellant with 0 percent CMA content, to 0.4 in./sec. for low concentrations (e.g., 25 percent) of CMA and to 3.5 in./sec. for high concentrations (e.g., 75%) of CMA in the terpolymer. The equivalent concentration of CMA in the propellant ranged from about 5 to about 15 percent since the terpolymer (propellant binder) made up about 20 percent by weight of the propellant composition in each composition A, B, and C.

The burning rate data set forth above indicates that the burning rates of the propellants of this invention increases with increased CMA content. The CMA content and burning rate of a propellant are proportional. Thus, when the CMA contents and burning rates are plotted on a graph, one can predict a burning rate for a particular CMA content.

The CMA content (and burning rate) of a propellant can be easily controlled by not only varying the CMA content of the terpolymer, but in addition by varying the amount of the terpolymer used in the finished propellant. Since the terpolymer can be used along with present conventional carboxy terminated (CTPB) binders or with polybutadiene acrylic acid copolymer (PBAA) binders, a wide variation in the number of compositions containing varying amounts of CMA are easily obtained. The many possible compositions provide a wide selection of propellants having burning rates at the desired level for a particular function.

The examples set forth below illustrate how a high percent CMA content terpolymer (e.g., 75 percent CMA content) may be used with conventional carboxyterminated polybutadiene in varying proportions to yield propellants having variable carboranyl methacrylate content and burning rates proportional to the carboranyl methacrylate content. The blended ammonium perchlorate, as used in compositions A, B, C, and D described earlier herein, is used in compositions E, F, and G to follow.

The terpolymer of this invention can be used with polybutadiene-acrylic acid copolymer (PBAA) in a like manner as used with carboxy-terminated polybutadiene (CTPB). Also, the terpolymer of this invention may be used with combinations of PBAA and CTPB in the amounts as set forth for each of the binder materials. /8n

| Composition | Ingredients | Percent by Weight |
|---|---|---|
| E | Terpolymer | 7.8 |
| | Carboxy-terminated polybutadiene | 11.9 |
| | AP | 64.0 |
| | Aluminum powder fuel | 16.0 |
| | Lecithin | 0.3 |
| | TOTAL | 100.0 |
| F | Terpolymer | 10.0 |
| | Carboxy-terminated polybutadiene | 9.7 |
| | AP | 64.0 |
| | Aluminum powder fuel | 16.0 |
| | Lecithin | 0.3 |
| | TOTAL | 100.0 |
| G | Terpolymer | 14.8 |
| | Carboxy-terminated polybutadiene | 4.9 |
| | AP | 64.0 |
| | Aluminum powder fuel | 16.0 |
| | Lecithin | 0.3 |
| | TOTAL | 100.0 |

The burning rates for compositions E, F, and G range from about 0.5 in./sec. to about 3 in./sec. Compositions E, F, and G contain about 6.0, 7.5, and 11 percent CMA in the propellant prior to curing. Curing may be accomplished by using from about 0.5 percent up to about 2 percent by weight of the combined propellant ingredients, a curative selected from diaziridines, triaziridines, diepoxides, triepoxides, and combinations of the same. The composition binder is constituted of a selected amount of the 75% CMA terpolymer (e.g., approximately, 40, 50, and 75%) and a selected amount of carboxyterminated polybutadiene (e.g., approximately 60, 50, and 25 percent) which provides approximately 20 percent binder for compositions E, F, and G.

The binder for propellants of this invention can make up to about 30 percent by weight of the composition. The binder can be comprised of all terpolymer or terpolymer and carboxy-terminated polybutadiene in desired amounts as determined by the carboranyl ion content and burning rate desired for the finished propellant. The blend of terpolymer to carboxy-terminated polybutadiene of from about 1:1 parts by weight to about 1:4 parts by weight respectively is easily made to provide a wide range of burning rates which are proportional to the carboranyl methacrylate content of the finished propellant.

Additional burning rate studies were carried out using a terpolymer (with 17 percent CMA content)

made in accordance with this invention. The propellant containing 20 percent by weight of the terpolymer with the specified CMA content showed a burning rate of about 0.36 in./sec/ at 1000 psi. Other propellant ingredients were as set forth for compositions A, B, and C above. Although blended AP, as specified, was selected for testing A, B, C, the propellant containing the 17 percent CMA terpolymer, and for comparison with a standard composition D, other types of AP may be used. For example, all AP with the same particle size, either coarse or fine particle size, or mixtures of the same, may be used. The improvement in burning rate of a propellant containing the terpolymer binder over a standard containing the same type AP, but with carboxy terminated polybutadiene binder instead of the novel terpolymer, is likewise, proportional to the CMA content of the terpolymer and propellant.

The present day requirements of missiles having propellants with both lower and higher burning rates (e.g., such as for sustainer or booster charge of propellant) can be met with the terpolymer of this invention. The control of burning rates of propellants for use in rockets having several stages can be achieved with selected terpolymers of this invention. The terpolymers of this invention cna be easily tailored to meet the requirements for propellant burning rates used for single stage rockets and other functions as well.

I claim:

1. A propellant composition comprising a binder selected from the group consisting of a terpolymer constituted of the monomers consisting of carboranyl methacrylate in amounts from about 15 to about 75 percent by weight of said terpolymer, butadiene in amounts from about 10 to about 80 percent by weight of said terpolymer, and acrylic acid in amounts from about 2 to about 20 percent by weight of said terpolymer, said terpolymer in combination with carboxy-terminated polybutadiene and said terpolymer in combination with polybutadiene-acrylic acid copolymer; ammonium perchlorate oxidizer; and aluminum fuel.

2. The propellant composition of claim 1 containing from about 15 to about 30 percent of said terpolymer by weight of said composition, from about 50 to about 70 percent of said ammonium perchlorate oxidizer by weight of said composition; from about 10 to about 20 percent of said aluminum fuel by weight of said composition; and said propellant composition additionally comprising lecithin, said lecithin being used in amounts from about 0.2 to about 0.5 percent by weight of said propellant composition.

3. The propellant composition of claim 2 and wherein said binder is said terpolymer in the amount of about 20 weight percent of said composition, said terpolymer containing carboranyl methacrylate in amounts from about 25 weight percent to about 75 weight percent; wherein said ammonium perchlorate oxidizer is present in the amount of about 64 weight percent of said composition, said ammonium perchlorate oxidizer being a blend containing substantially 36 percent by weight of said blend of 6 micron particle sized ammonium perchlorate, 27 percent by weight of said blend of 17 micron particle sized ammonium perchlorate, and 37 percent by weight of said blend of 200 micron particle sized ammonium perchlorate; wherein said aluminum fuel is present in the amount of about 16 weight percent of said composition; and wherein said lecithin is present in the amount of about 0.3 weight percent of said composition; and wherein said propellant composition additionally includes additive curatives in the amount of up to about 2 percent by weight of the combined total weights of the other propellant ingredients, said curatives being selected from diaziridines, triaziridines, diepoxides, triepoxides, and combination of the same.

4. The propellant composition of claim 1 and wherein said binder is said terpolymer in combination with said carboxy-terminated polybutadiene, said terpolymer being used in combination with said carboxy-terminated polybutadiene in amounts to provide a carboranyl methacrylate content in said propellant composition of from about 5 to about 15 weight percent of said propellant composition; said ammonium perchlorate oxidizer being present in an amount from about 50 to about 70 percent by weight of said propellant composition; said aluminum fuel being present in an amount from about 10 to about 20 percent by weight of said propellant composition; and said propellant composition additionally comprising lecithin, said lecithin being used in amounts from about 0.2 to about 0.5 percent by weight of said propellant composition.

5. The propellant composition of claim 4 and wherein said binder is comprised of said terpolymer which contains carboranyl methacrylate in the amount of about 75 percent by weight of said terpolymer and said carboxy-terminated polybutadiene in combination therewith of from about 1:1 to about 1:4 parts by weight of said terpolymer to carboxy-terminated polybutadiene; said ammonium perchlorate oxidizer being present in an amount of about 64 percent by weight of said propellant composition, said ammonium perchlorate being a blend containing substantially 36 percent by weight of said blend of 6 micron particle sized ammonium perchlorate, 27 percent by weight of said blend of 17 micron particle sized ammonium perchlorate, and 37 percent by weight of said blend of 200 micron particle sized ammonium perchlorate; said aluminum fuel being present in an amount of about 16 percent by weight of said propellant composition; said lecithin being present in an amount of about 0.3 percent by weight of said propellant composition; and wherein said propellant composition additionally includes additive curatives as an ingredient in the amount of up to about 2 percent by weight of the combined total weights of the other propellant ingredients, said curatives being selected from diaziridines, triaziridines, diepoxides, triepoxides, and combinations of the same.

6. The propellant composition of claim 1 and wherein said binder is said terpolymer in combination with said polybutadiene-acrylic acid copolymer, said terpolymer being used in combination with said polybutadiene-acrylic acid copolymer in amounts to provide a carboranyl methacrylate content in said propellant composition of from about 5 to about 15 weight percent of said propellant composition; said ammonium perchlorate oxidizer being present in an amount from about 50 to about 70 percent by weight of said propellant composition; said aluminum fuel being present in an amount from about 10 to about 20 percent by weight of said propellant composition; and said propellant composition additionally comprising lecithin, said lecithin being used in amounts from about 0.2 to about 0.5 percent by weight of said propellant composition.

7. The propellant composition of claim 6 and wherein said binder is comprised of said terpolymer which contains carobranyl methacrylate in the amount of about 75 percent by weight of said terpolymer and said polybutadiene-acrylic acid copolymer in combination therewith of from about 1:1 to about 1:4 parts by weight of said terpolymer to said polybutadiene-acrylic acid copolymer; said ammonium perchlorate oxidizer being present in an amount of about 64 percent by weight of said propellant composition; said ammonium perchlorate being a blend containing substantially 36 percent by weight of said blend of 6 micron particle sized ammonium perchlorate, 27 percent by weight of said blend of 17 micron particle sized ammonium perchlorate, and 37 percent by weight of said blend of 200 micron particle sized ammonium perchlorate; said aluminum fuel being present in an amount of about 16 percent by weight of said propellant composition; said lecithin being present in an amount of about 0.3 percent by weight of said propellant composition; and wherein said propellant composition additionally includes additive curatives as an ingredient in the amount of up to about 2 percent by weight of the combined total weights of the other propellant ingredients, said curatives being selected from diaziridines, triaziridines, diepoxides, triepoxides, and combinations of the same.

* * * * *